United States Patent [19]

Yu et al.

[11] Patent Number: 5,244,961
[45] Date of Patent: Sep. 14, 1993

[54] THERMOPLASTIC COMPOSITIONS AND PROCESS FOR PREPARING THE SAME

[75] Inventors: Thomas C. Yu, Chatham; Hsien C. Wang, Edison; Kenneth W. Powers, Berkeley Heights, all of N.J.

[73] Assignee: Exxon Chemical Patents Inc., Linden, N.J.

[21] Appl. No.: 762,284

[22] Filed: Sep. 19, 1991

[51] Int. Cl.$^5$ ............................................. C08L 77/00
[52] U.S. Cl. .................................... 524/514; 523/307; 523/324; 525/179; 525/184
[58] Field of Search ................ 525/179, 184; 524/514; 523/307, 324

[56] References Cited

U.S. PATENT DOCUMENTS

| | | | |
|---|---|---|---|
| 2,446,536 | 8/1948 | Hardy | 525/178 X |
| 2,516,741 | 7/1950 | Young et al. | 525/178 X |
| 4,143,221 | 3/1979 | Naarmann et al. | 525/333.4 X |
| 4,172,858 | 10/1979 | Clubley et al. | 525/2 |
| 4,172,859 | 10/1979 | Epstein | 428/402 |
| 4,350,794 | 9/1982 | Moncur | 525/183 |
| 4,404,325 | 9/1983 | Mason et al. | 525/179 |
| 4,436,872 | 3/1984 | Flood et al. | 525/179 |
| 4,837,264 | 6/1989 | Zahradnik et al. | 525/66 X |
| 5,013,789 | 5/1991 | Sahuma et al. | 525/60 |
| 5,013,793 | 5/1991 | Wang et al. | 525/333.4 X |
| 5,063,268 | 11/1991 | Young | 525/333.4 X |

*Primary Examiner*—Joseph L. Schofer
*Assistant Examiner*—J. M. Reddick
*Attorney, Agent, or Firm*—M. L. Gibbons; J. E. Schneider

[57] ABSTRACT

A non-vulcanized thermoplastic composition comprising a polyamide and an elastomeric halogen-containing copolymer of a $C_4$ to $C_7$ isomonoolefin and a para-alkylstyrene is prepared by blending the polyamide and elastomeric copolymer in the presence of specified metal compounds in an amount insufficient for vulcanizing the composition. Optionally, the resulting composition may be subjected to vulcanization.

19 Claims, No Drawings

THERMOPLASTIC COMPOSITIONS AND PROCESS FOR PREPARING THE SAME

BACKGROUND OF THE INVENTION

1. Field of the Invention

The invention relates to an improved process for preparing thermoplastic compositions and thermoplastic compositions obtained by the improved process.

2. Description of Information Disclosures

Blends of various engineering resins, such as polyamides, with other polymers are known.

U.S. Pat. No. 4,174,358 discloses a thermoplastic composition containing a polyamide matrix resin and at least one polymer having a specified tensile modulus. U.S. Pat. No. 4,172,859 discloses a thermoplastic composition containing a polyester, a polycarbonate and at least one polymer having a specified tensile modulus.

U.S. Pat. No. 4,350,794 discloses a polyamide molding and extrusion composition prepared by melt blending a polyamide resin and a polyamide reactive halogen functional elastomer. It states that an acid acceptor, such as magnesium oxide, may also be desirable to react with HCl generated by the coupling reaction (Column 5, lines 39 to 42). In Example 17, magnesium oxide (4.2 grams) is added to a blend of nylon 66 and chlorobutyl rubber (Column 7, lines 5 to 6).

There is still a need to improve the properties of thermoplastic compositions.

It has now been found that the presence of specified metal compounds during the process of preparing a polymer blend will produce thermoplastic compositions having increased impact resistance at low temperatures.

SUMMARY OF THE INVENTION

In accordance with the invention, there is provided a process for preparing a non-vulcanized thermoplastic composition comprising a polymer blend, which comprises the step of:

contacting, in a contacting zone, a thermoplastic polyamide, and an unvulcanized elastomeric halogen-containing copolymer of a $C_4$ to $C_7$ isomonoolefin and a para-alkylstyrene with a metal compound capable of sorbing or reacting with hydrogen halide, the metal constituent of said metal compound being selected from the group consisting of Group IB, Group IIA, Group IIB, Group IVA, Group IVB, the non-noble metals of Group VIII of the Periodic Table of Elements, and mixtures thereof, said metal compound being present in said contacting zone in an amount insufficient to vulcanize said thermoplastic composition.

In accordance with the invention there is also provided the non-vulcanized composition obtained by the above stated process.

DETAILED DESCRIPTION OF THE INVENTION

A thermoplastic polyamide and an unvulcanized elastomeric halogen-containing copolymer of a $C_4$ to $C_7$ isomonoolefin and a para-alkylstyrene are contacted with a metal compound capable of sorbing or reacting with a hydrogen halide, hereinafter designated "the basic metal compound", in a contacting zone where the components are mixed at non-vulcanization conditions. The contacting zone may be a mixer such as a roll mill, Banbury ® mixer, continuous mixers, kneaders, mixing extruder, etc. Suitable basic metal compounds include compounds having a metal constituent selected from the Group consisting of Group IB, Group IIA, Group IIB, Group IVA, Group IVB, the non-noble metals of Group VIII of the Periodic Table of Elements and mixtures thereof. The preferred metal constituents are selected from the group consisting of copper, beryllium, magnesium, calcium, strontium, barium, zinc, cadmium, titanium, zirconium, germanium, tin, lead, iron, cobalt, nickel, ruthenium, and mixtures thereof. The more preferred metal constituents are selected from the group consisting of copper, magnesium, calcium, zinc, cadmium, tin, lead, titanium, cobalt, iron, nickel and mixtures thereof. The most preferred metal constituents are selected from the group consisting of zinc, magnesium, titanium and mixtures thereof. The preferred compounds are selected from the group consisting of oxides, phosphates, carbonates, alkoxides, carboxylates and mixtures thereof of said metals. The most preferred compounds are selected from the group consisting of zinc oxide, magnesium oxide and neoalkoxy, tri(dioctyl) pyrophosphato titanate which can be represented by the formula:

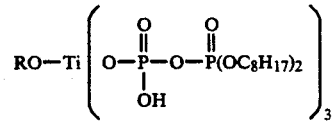

such as those sold under the tradename Ken-React Caps L38 by Kenrich Petrochemical, Inc., and mixtures of these compounds.

The Periodic Table referred to herein is in accordance with the periodic table published by Sargent-Welch, copywright 1968, Sargent-Welch Scientific Company. The basic metal compound is added to the polyamide and to the elastomeric halogen-containing copolymer in an amount insufficient to effect vulcanization of the thermoplastic composition but in an effective amount. By "effective amount" is intended herein an amount sufficient to increase the rate of reaction of the polyamide with the elastomeric copolymer to produce a composition having a higher impact resisitance compared to the impact resistance of the same blend mixed without the basic compound. Although not wishing to be bound by theory, it is believed that the specified basic metal compound functions as a catalyst to promote the coupling reaction between the polyamide and the elastomeric halogen-containing copolymer.

Suitable amounts of basic metal compound in the contacting step include a molar ratio of the basic metal compound to the halogen content of the elastomeric halogen-containing copolymer of less than about 10:1. The molar ratio may range from about 0.1:1 to about 10:1, preferably from about 0.5:1 to about 2:1.

The thermoplastic polyamides suitable for practice of the present invention may be used singly or in combination.

Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidone, lauryllactam and aminoundecanoic lactam, or amino acid, or by condensation of dibasic acids and diamines. Both fiber-forming and molding grade nylons are suitable. Examples of such polyamides are polycaprolactam (nylon-6), polylauryllactam (nylon-12), polyhexamethylene-adipamide (nylon-6,6), poly-hexamethyleneazelamide (nylon-6,9), polyhexamethylene sebacamide (nylon-6,10), polyhexamethyleneisophthalamide (nylon-6,IP) and the condensation product of 11-amino- undecanoic acid (nylon-11); partially aromatic polyamides made by polycondensation of meta xylene diamine and adipic acid such as the polyamides having the structural formula:

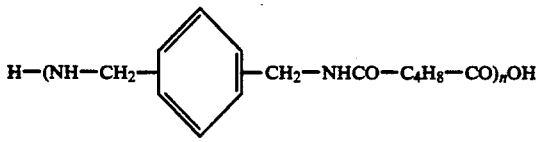

Furthermore, the partially aromatic polyamide may be reinforced, for example, by glass fibers. Additional examples of satisfactory polyamides are described in Kirk-Othmer, Encyclopedia of Chemical Technology, v. 10, page 919, and Encyclopedia of Polymer Science and Technology, Vol. 10, pages 392–414. Commercially available thermoplastic polyamides may be advantageously used in the practice of this invention, with polyamides having a softening point or melting point between 160° to 275° C. being preferred. The more preferred polyamides are nylon 6; nylon 6.6, and nylon 11.

The Elastomeric Halogen-Containing Copolymer Component

Suitable halogen-containing copolymers of a $C_4$ to $C_7$ isomonoolefin and a para-alkylstyrene for use as a component of the composition of the present invention comprise at least about 0.5 weight percent of the para-alkylstyrene moiety. For elastomeric copolymers, the para-alkylstyrene moiety may range from about 0.5 weight percent to about 20 weight percent, preferably from about 1 to about 20 weight percent, more preferably from about 2 to about 20 weight percent of the copolymer. The halogen content of the copolymers may range from an effective amount above zero to about 7.5 weight percent, preferably from about 0.1 to about 7.5 weight percent. The halogen may be bromine, chlorine, and mixtures thereof. Preferably, the halogen is bromine. The major portion of the halogen is chemically bound to the para-alkyl group, that is, the halogen-containing copolymer comprises para-haloalkyl groups.

The copolymers of the isomonoolefin and para-alkylstyrene useful to prepare the halogen-containing copolymers suitable as components of the composition of the present invention include copolymers of isomonoolefin having from 4 to 7 carbon atoms and a para-alkylstyrene, such as those described in European patent application 89305395.9 filed May 26, 1989, (Publication No. 0344021 published Nov. 29, 1989). The preferred isomonoolefin comprises isobutylene. The preferred para-alkylstyrene comprises para-methylstyrene. Suitable copolymers of an isomonoolefin and a para-alkylstyrene include copolymers having a number average molecular weight ($\overline{Mn}$) of at least about 25,000, preferably at least about 30,000, more preferably at least about 100,000. The copolymers also, preferably, have a ratio of weight average molecular weight ($\overline{Mw}$) to number average molecular weight ($\overline{Mn}$), i.e., $\overline{Mw}/\overline{Mn}$ of less than about 6, preferably less than about 4, more preferably less than about 2.5, most preferably less than about 2. The brominated copolymer of the isoolefin and para-alkylstyrene by the polymerization of these particular monomers under certain specific polymerization conditions now permit one to produce copolymers which comprise the direct reaction product (that is, in their as-polymerized form), and which have unexpectedly homogeneous uniform compositional distributions. Thus, by utilizing the polymerization and bromination procedures set forth herein, the copolymers suitable for the practice of the present invention can be produced. These copolymers, as determined by gel permeation chromatography (GPC) demonstrate narrow molecular weight distributions and substantially homogeneous compositional distributions, or compositional uniformity over the entire range of compositions thereof. At least about 95 weight percent of the copolymer product has a para-alkylstyrene content within about 10 weight percent, and preferably within about 7 weight percent, of the average para-alkylstyrene content for the overall composition, and preferably at least about 97 weight percent of the copolymer product has a para-alkylstyrene content within about 10 weight percent and preferably within about 7 weight percent, of the average para-alkylstyrene content for the overall composition. This substantially homogeneous compositional uniformity thus particularly relates to the intercompositional distribution. That is, with the specified copolymers, as between any selected molecular weight fraction the percentage of para-alkylstyrene therein, or the ratio of para-alkylstyrene to isoolefin, will be substantially the same, in the manner set forth above.

In addition, since the relative reactivity of an isoolefin such as isobutylene with para-alkylstyrene is close to one, the compositional distribution of these copolymers will also be substantially homogeneous. That is, these copolymers are essentially random copolymers, and in any particular polymer chain the para-alkylstyrene and isoolefin units will be essentially randomly distributed throughout that chain.

The halogen-containing copolymers useful in the practice of the present invention have a substantially homogeneous compositional distribution and include the para-alkylstyrene moiety represented by the formula:

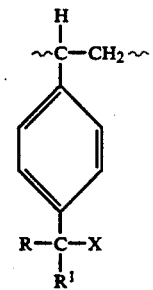

in which R and $R^1$ are independently selected from the group consisting of hydrogen, alkyl preferably having from 1 to 5 carbon atoms, primary haloalkyl, secondary haloalkyl, preferably having from 1 to 5 carbon atoms, and mixtures thereof and X is selected from the group consisting of bromine, chlorine and mixtures thereof, such as those disclosed in European patent application 8930595.9 filed May 26, 1989, (Publication No. 0344021 published Nov. 29, 1989).

Various methods may be used to produce the copolymers of isomonoolefin and para-alkylstyrene, as described in said European publication. Preferably, the polymerization is carried out continuously in a typical continuous polymerization process using a baffled tank-type reactor fitted with an efficient agitation means, such as a turbo mixer or propeller, and draft tube, external cooling jacket and internal cooling coils or other means of removing the heat of polymerization, inlet pipes for monomers, catalysts and diluents, temperature sensing means and an effluent overflow to a holding drum or quench tank. The reactor is purged of air and moisture and charged with dry, purified solvent or a mixture of solvents prior to introducing monomers and catalysts.

Reactors which are typically used in butyl rubber polymerization are generally suitable for use in a polymerization reaction to produce the desired para-alkylstyrene copolymers suitable for use in the process of the present invention. The polymerization temperature may range from about minus 35° C. to about minus 100° C., preferably from about minus 40 to about minus 95° C.

The processes for producing the copolymers can be carried out in the form of a slurry of polymer formed in the diluents employed, or as a homogeneous solution process. The use of a slurry process is, however, preferred, since in that case, lower viscosity mixtures can be produced in the reactor and slurry concentration of up to 40 wt. percent of polymer are possible.

The copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Typical examples of the diluents which may be used alone or in a mixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

An important element in producing the copolymer is the exclusion of impurities from the polymerization reactor, namely, impurities which, if present, will result in catalyst poisoning or excessive molecular weight depression by complexing with the catalyst or copolymerization with the isomonoolefins or the para-alkylstyrene, which in turn will prevent one from efficiently producing the para-alkylstyrene copolymer product useful in the practice of the present invention. Most particularly, these impurities include the catalyst poisoning materials, such as, for example. moisture and the like and other copolymerizable monomers, such as, for example, meta-alkylstyrenes and the like. These impurities should be kept out of the system.

In producing the suitable copolymers, it is preferred that the para-alkylstyrene be at least 95.0 wt. percent pure, preferably 97.5 wt. percent pure, most preferably 99.5 wt. percent pure and that the isomonoolefin be at least 99.5 wt. percent pure, preferably at least 99.8 wt. percent pure and that the diluents employed be at least 99 wt. percent pure, and preferably at least 99.8 wt. percent pure.

The most preferred Lewis acid catalysts are ethyl aluminum dichloride and preferably mixtures of ethyl aluminum dichloride with diethyl aluminum chloride. The amount of such catalysts employed will depend on the desired molecular weight and the desired molecular weight distribution of the copolymer being produced, but will generally range from about 20 ppm to 1 wt. percent and preferably from about 0.01 to 0.2 wt. percent, based upon the total amount of monomer to be polymerized.

Halogenation of the polymer can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. No. 4,548,995, which is hereby incorporated by reference.

Suitable solvents for solution halogenation include the low boiling hydrocarbons ($C_4$ to $C_7$) and halogenated hydrocarbons. Since the high boiling point of para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

It should be noted that radical bromination of the enchained para-methylstyryl moiety in the copolymers useful for the practice of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the suitable para-methylstyrene/isobutylene copolymers in hydrocarbon solvents such as pentane, hexane, heptane or cyclohexane can be selectively brominated using light, heat, or selected radical initiators (according to conditions, i.e., a particular radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scission and/or cross-linking.

This reaction can be initiated by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is, thus, preferred to utilize an initiator which has a half life of between about 0.5 and 2500 minutes under the desired reaction conditions, more preferably about 10 to 300 minutes. The amount of initiator employed will usually vary between 0.02 and 1 percent by weight on the copolymer, preferably between about 0.02 and 0.3 percent. The preferred initiators are bis-azo compounds, such as azobis isobutyronitrile (AIBN), azobis (2,4-dimethylvalero) nitrile, azobis (2-methylbutyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of the copolymers of para-methylstyrene and isobutylene can be highly selective under appropriate conditions, and almost exclusively produces the desired benzylic bromine functionality. Indeed, the only major side reaction which appears to occur is disubstitution at the para-methyl group, to yield the dibromo derivative, but even this does not occur until more than about 60 percent of the enchained para-methylstyryl moieties have been monosubstituted. Hence, any desired amount of benzylic bromine functionality in the monobromo form can be introduced into the above stated copolymers, up to about 60 mole percent of the para-methylstyrene content.

It is desirable that the termination reactions be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers can be recovered and finished using conventional means with appropriate stabilizers being added to yield highly desirable and versatile functional saturated copolymers.

In summary, halogenation to produce a copolymer useful as a component of the composition of the present invention is preferably accomplished by halogenating an isobutylene-para-methylstyrene copolymer using bromine in a normal alkane (e.g., hexane or heptane) solution utilizing a bis azo . initiator, e.g., AIBN or VAZO ® 52: 2,2'-azobis- (2,4-dimethylpentane nitrile), at about 55° to 80° C., for time period ranging from about 4.5 to about 30 minutes, followed by a caustic quench. The recovered polymer is washed in basic water wash and water/isopropanol washes, recovered, stabilized and dried.

Since little, if any, tertiary benzylic bromine is produced in the molecule (when the halogenation agent is a brominating agent), the potential dehydrohalogenation reaction will be almost entirely eliminated. This results in a halogenated polymer with the improved stability needed for processing at the high temperatures required for melt mixing and processing with engineering resins.

In the compositions of the present invention, the thermoplastic polyamide (which may be one or more) may suitably be present in an amount ranging from about 10 to 98 weight percent, preferably from about 20 to 95 weight percent, the elastomeric halogen-containing copolymer of an isomonoolefin and a para-alkylstyrene may be present in an amount ranging from about 2 to 90 weight percent, preferably from about 5 to 80 weight percent, based on the polymer blend.

The term "polymer blend" is used herein to denote the blend of one or more thermoplastic engineering resins, the elastomeric halogen-containing copolymer and any other polymers (elastomer or non-elastomer) that may be a component of the composition. Optionally, additional polymers may be included in the composition of the present invention. Suitable additional polymers include polyolefins, such as polypropylene, polyethylene, for example, low density polyethylene (LDPE), linea low density polyethylene (LLDPE), preferably high density polyethylene (HDPE), as well as copolymers of ethylene with vinylacetate, acrylic acid, methyl acrylate, ethyl acrylate, etc.; an elastomeric copolymer of a $C_4$ to $C_7$ isomonoolefin and a para-alkylstyrene, and mixtures thereof.

A preferred optional additional elastomeric polymer is a copolymer of a $C_4$ to $C_7$ isomonoolefin and a para-alkylstyrene such as the copolymers used to prepare the halogen-containing elastomeric copolymer. The preferred copolymer of a $C_4$ to $C_7$ isomonoolefin and a para-alkylstyrene is a copolymer of isobutylene and para-methylstyrene.

The secant flexural modulus of the unvulcanized thermoplastic compositions may range from about 200 $kg/cm^2$ to about 100,000 $kg/cm^2$, preferably from about 30,000 $kg/cm^2$ to about 100,000 $kg/cm^2$ measured according to ASTM D790 at 1% strain.

The polymer blend may comprise about 25 to about 98 wt. percent of the overall composition. In addition to its polymer components, the composition of the present invention may comprise fillers, and additives such as antioxidants, antiozonants, stabilizers, rubber processing oils, lubricants (e.g., oleamide), antiblocking agents, waxes, foaming agents, flame retardants, pigments, coupling agents for the fillers and other processing aids known to the rubber compounding art. Additional or other ,basic metal compounds, e.g., MgO, can be included in a second stage addition to act as acid acceptors or heat stabilizers. The pigments and fillers may comprise up to 30 wt. percent of the total composition based on polymer components plus additives. Preferably, the pigments and fillers comprise about 1 to about 30 wt. percent based on the composition, more preferably about 2 to about 20 weight percent of the overall composition.

The term "filler" is used herein to denote a solid additive incorporated in the composition to modify its physical properties.

Suitable fillers include talc, calcium carbonate, glass fibers, clays, silica, carbon black and mixtures thereof. Any type of carbon black can be used, such as channel blacks, furnace blacks, thermal blacks, acetylene black, lamp black and the like. Titanium dioxide, also considered a pigment, can be used to impart a white color to the final product.

Rubber process oils have particular ASTM designations depending on whether they fall into the class of paraffinic, naphthenic or aromatic process oils. The type of process oil utilized will be that customarily used in conjunction with the rubber component. The skilled rubber chemist will recognize which type of oil should b utilized with a particular rubber. The quantity of rubber process oil utilized is based on the total rubber content, and can be defined as the ratio, by weight, of process oil to the rubber in the composition. This ratio can vary from about 0.3/1 to about 1.3/1: preferably about 0.5/1 to about 1.2/1: more preferably about 0.8/1 to about 1.1/1. Oils other than petroleum based oils such as oils derived from coal tar and pine tar can also be utilized. In addition to the petroleum derived rubber process oils, organic esters and other synthetic plasticizers can be used. As used herein, the term "process oil" means both hydrocarbonaceous oils and synthetic plasticizers.

The process oil may be included in the composition to insure that the composition has good flow properties. The quantity of oil utilized will depend in part on the amount of polymer blend and filler used. Generally, the process oil, when included, may comprise about 30 wt. percent of the composition. Larger amounts of process oil can be used, the deficit being reduced physical strength.

Antioxidants may be utilized in the composition of this invention to enhance further the improved aging properties of the elastomeric copolymers component of the present invention and to protect the engineering resins. The particular antioxidant utilized will depend on the rubbers and plastics utilized and more than one type may be required. Their proper selection is well within the skill of the rubber chemist. Antioxidants will generally fall into the class of chemical protectors or physical protectants. Physical protectants are used where there is to be little movement in the part to be manufactured from the composition. These are generally waxy materials which impart a "bloom" to the surface of the rubber part and form a protective coating or shield the part from oxygen, ozone, etc.

The chemical protectors generally fall into three chemical groups: secondary amines, phenolics and phosphites. Illustrative, non-limiting examples of types of antioxidants useful in the practice of this invention are hindered phenols, amino phenols, hydroquinones, alkyldiamines, amine condensation products, etc. Non-limiting examples of these and other types of antioxidants are styrenated phenol; 2,2'-methylene-bis-(4-methyl-6-t-butylphenol); 2,6'-di-t-butyl-o-dimethylamino-p-cresol; hydroquinone monobenzyl ether, octylated diphenyl amine, phenyl-beta-naphthlylamine; N,N'-diphenylethylene diamine; aldol-alpha-naphthylamine; N,N'-di-phenyl-p-phenylene diamine, etc. The physical antioxidants include mixed petroleum waxes and microcrystalline waxes.

In the practice of this invention, the polyamide, the elastomeric halogen-containing copolymer, the basic metal compound of the previously specified metals and optional other polymers are mixed together at a temperature sufficient to soften the polyamide or, more commonly, at a temperature above its melting point when the polyamide is crystalline at room temperature.

The temperature during the mixing and blending in the presence of the non-vulcanizing amount of the specified basic metal compound may range from about the melting point of the polyamide present to about 300° C.

A preferred thermoplastic composition comprises a polyamide such as nylon 6; nylon 6,6; nylon 11 and mixtures thereof, a brominated copolymer of isobutylene and para-methylstyrene as the elastomeric halogen-containing copolymer, and zinc oxide in an amount insufficient to effect degradation or vulcanization (i.e. crosslinking) of the thermoplastic composition.

If desired, subsequently the unvulcanized composition of the present invention may be subjected to vulcanization depending upon the desired end use. Any curative which is capable of vulcanizing saturated halogenated copolymers of a $C_4$ to $C_7$ isomonoolefin and a para-alkylstyrene, partially or fully can be used. When it is desired to produce a vulcanized composition which is still thermoplastic, then peroxide curatives would be excluded when the composition to be subjected to vulcanization comprises as a component an engineering resin that would itself be crosslinked by the peroxide curative. Suitable crative systems for the unvulcanized composition of the present invention include zinc oxide in combination with zinc stearate or stearic acid and, optionally, one or more of the following accelerators or vulcanizing agents: Permalux (di-ortho-tolyyguanidine salt of dicatechol borate), HVA-2 (m-phenylene bis maleimide), Zisnet (2,4,6-trimercapto-5-triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD (diphenyl phenylene diamine), salicyclic acid (o-hydroxy benzoic acid), wood rosin (abietic acid), and TMTDS (tetramethyl thiuram disulfide) in combination with sulfur.

The vulcanization system is added to the unvulcanized composition of the present invention at a temperature above the melting point of the polyamide and any other engineering resin present in the composition. Suitable vulcanization temperatures may range from about the melting point of the resin to about 300° C., typically from about 160° C. to about 275° C. The vulcanization may be conducted under static conditions or dynamic conditions, that is, under conditions of high shear.

The secant flexural modulus of the vulcanized composition may range from about 100 kg/cm$^2$ to about 400,000 kg/cm$^2$ preferably from about 200 kg/cm$^2$ to about 100,000 kg/cm$^2$, measured according to ASTM D790 at 1% strain

PREFERRED EMBODIMENTS

The following examples are presented to illustrate the invention. All parts and percentages herein are by weight unless otherwise specified.

All compositions in accordance with the invention and comparative compositions were mixed in a 0.8" Welding Engineers counter-rotating twin screw extruder fitted with a strand die at the extruder exit. The extruder strands were then cooled in a water bath before being reduced by a pelletizer into approximately ⅛" by ⅛" pellets. The polyamide resins were dried at 150° F. (65.56° C.) under vacuum for at least four hours before compounding. All compositions were again dried in the same dryer under the same conditions for at least four hours to remove surface moisture before being molded into various test specimens on a 15 ton Boy ® injection molding machine.

Table IV shows the characteristics of the brominated copolymer of isobutylene and para-methylstyrene. The abbreviations and/or trademarks used in the following examples are shown in Table V. The test methods used to measure the properties are shown in Table VI.

Example 1

Table I shows various compositions of copolymer T modified PA-6 blends. Composition A shows the properties of PA-6 (Capron 8209F) control. Composition B, was a blend of 80/20 PA-6 to copolymer T. In Composition B, copolymer Y was used. It can be seen from its elongation and notched Izod values that copolymer Y was not an effective impact modifier. Copolymer T was a brominated copolymer of isobutylene and para-methylstyrene. Copolymer Y was a copolymer of isobutylene and para-methylstyrene.

A second series of experiments was conducted as shown in Compositions F and G, in which the amount of Copolymer T in each blend was increased to 30 weight percent. A marked impact strength improvement of zinc oxide catalyzed Copolymer T blend (Composition F) over the uncatalyzed Copolymer T (Composition G) blend was noticed. For example, at −30° C., the notched Izod for the zinc oxide catalyzed blend was 11.26 compared to 2.62 for the uncatalyzed blend. It should be noted that the stiffness (flexural modulus) of these materials remained high, i.e., in the 200,000 to 250,000 psi range.

Example 2

Table II shows various compositions of brominated copolymer of isobutylene and para-methylstyrene modified PA-6,6 blends. Compositions J and K were PA 6,6 controls which showed only a 1 Ft-lb/in notched Izod at room temperature. Composition L was a blend of 80/20 PA-6,6 and a copolymer of isobutylene and para-methylstyrene. In Composition L, Copolymer Y was used to modify PA-6,6, and resulted in very poor notched Izod impact.

When the amount of Copolymer T was increased to 30 wt.%, a very significant improvement in impact was achieved with the catalyzed blend (Composition P) over the uncatalyzed blend (Composition 0). For example, room temperature notched Izod impact was improved from 4.1 to 16.4. In Composition Q, Copolymer P was first dusted with 0.5 weight percent of magnesium oxide before melt blending with 70 weight percent PA 6,6. Superior notched Izod were obtained from room temperature to minus 40° C. A neoalkoxyl titanate catalyst (Ken React Caps L38/E) was used in Composition R, and a room temperature notched Izod impact of 14.2 was obtained.

Compositions P, Q, R, were compositions in accordance with the present invention.

Room temperature notched Izod values ranging from 10 to 20 are considered superior notched Izod values.

Example 3

Table III shows four types of copolymer that were extended with polyolefin, non-reacting and reacting elastomers. Composition S shows a Copolymer P which was extended by 30% high density polyethylene on a Banbury mixer. The extended blends were no longer tacky, and can be used to produce free flowing pellets. A small amount of curatives were added to partially vulcanize Copolymer P, to promote encapsulation of Copolymer P by high density polyethylene to reduce tackiness. In composition T, 20% non-reacting Copolymer Y and 30% high density polyethylene were used to extend Copolymer T to produce a free pelletizable elastomer, and again Copolymer T was slightly crosslinked to promote encapsulation of Copolymer T by high density polyethylene. In Compositions U and V, 30% non-reacting Copolymer Y and 50% maleic anhydride modified ethylene-propylene rubber were utilized as extenders to modify Copolymer P and Copolymer T, respectively. Both were blended on a Banbury mixer.

Compositions S, T, U at 30% were melt mixed with PA-6 using zinc oxide as a catalyst to yield Compositions W, X, and Y. Vast improvement of room temperature notched Izod impact over PA-6 was observed for all three compositions. Composition Y at 25% was melt blended with PA-6 with zinc oxide as a catalyst to yield Composition Z, which even at −10° C. showed a 11 notched Izod impact.

Compositions W, X, Y and Z, were compositions in accordance with the present invention.

TABLE I

COPOLYMER T/POLYAMIDE 6 BLENDS
(Dry As Molded Specimen)

| Composition | A | B | F | G |
|---|---|---|---|---|
| Copolymer T* | | | 30 | |
| Copolymer T | | | | 30 |
| Copolymer T** | | | | |
| Copolymer Y | | 20 | | |
| Capron 8209F | 100 | 80 | 70 | 70 |
| Irganox B-215 | | 0.1 | 0.1 | 0.1 |
| Property | | | | |
| Notched Izod Impact-⅛", Ft-lb/in. | | | | |
| 23° C. | 1.1 | 1.9 | 22.85 | 21.83 |
| 0° C. | 0.43 | 1.6 | 24.34 | 20.45 |
| −10° C. | 0.52 | | 21.74 | 19.98 |
| −20° C. | 0.84 | 1.3 | 17.18 | 4.79 |
| −30° C. | 0.73 | | 11.26 | 2.62 |
| −40° C. | 1.07 | | 2.21 | 1.56 |
| Tensile and Elongation | | | | |
| Tensile @ Yield, Kpsi | 10.6 | 7.6 | 5.7 | 8.4 |
| Elongation @ Yield, % | 8.5 | 7.3 | 7.27 | 7.3 |
| Tensile @ Break, Kpsi | 7.4 | 6.9 | 6.3 | 6.4 |
| Elongation @ Break, % | 64 | 16 | 200.3 | 224 |
| Flexural Properties | | | | |
| Modulus, Kpsi | 380 | 275 | 254.9 | 207.5 |

NOTE
*Dusted with 0.5% Zinc Oxide (Protox 169)
**Dusted with 0.5% Magnesium Oxide (Maglite D)

TABLE II

COPOLYMER T/POLYAMIDE 6,6 BLENDS
(Dry As Molded Specimen)

| Composition | J | K | L | O | P | Q | R |
|---|---|---|---|---|---|---|---|
| Copolymer T* | | | | | 30 | | |
| Copolymer T | | | | 30 | | | |

TABLE II-continued
COPOLYMER T/POLYAMIDE 6,6 BLENDS
(Dry As Molded Specimen)

| Composition | J | K | L | O | P | Q | R |
|---|---|---|---|---|---|---|---|
| Copolymer P** | | | | | | 30 | |
| Copolymer C | | | | | | | 25 |
| Copolymer Y | | | 20 | | | | |
| Celanese Nylon 1001 | 100 | | 80 | | 70 | 70 | 75 |
| Zytel 101 | | 100 | | 70 | | | |
| Neoalkoxyl Titanate*** | | | | | | | 2 |
| Irganox B-215 | | | 0.1 | 0.1 | 0.1 | 0.1 | 0.1 |
| Property | | | | | | | |
| Notched Izod Impact-⅛", Ft-lb/in. | | | | | | | |
| 23° C. | 1 | 1 | 0.9 | 4.1 | 16.4 | 20.1 | 14.2 |
| 0° C. | | | | 2.7 | 4.6 | 7.9 | 3.2 |
| −10° C. | | | | | 2.5 | 5.8 | 3.1 |
| −20° C. | | | 0.5 | 1.9 | 2.2 | 4.1 | |
| −30° C. | | | | | 1.3 | 2.8 | 1.3 |
| −40° C. | | | 0.7 | | 1.1 | 1.8 | |
| Tensile and Elongation | | | | | | | |
| Tensile @ Yield, Kpsi | 12 | 12 | 8.5 | 5.1 | 10.5 | | 6.3 |
| Elongation @ Yield, % | 12 | 12 | 8.4 | 5.5 | 8.4 | | 6.3 |
| Tensile @ Break, Kpsi | 5 | 5 | 7.1 | 6.9 | 35.3 | | 8 |
| Elongation @ Break, % | 60 | 50 | 34.4 | 26 | 37.8 | | 45.4 |
| Flexural Properties | | | | | | | |
| Modulus, Kpsi | 420 | 410 | 301 | 226 | 228 | | |

NOTE
*Dusted with 0.5% Zinc Oxide (Protox 169)
**Dusted with 0.5% Magnesium Oxide (Maglite D)
***Ken-React Caps 1.38/E from Kenrich Petrochemicals, Inc., Bayonne, NJ 07002

TABLE III
EXTENDED COPOLYMER/PA-6 BLENDS
(Dry As Molded Specimen)

| Composition | S | T | U | V | W | X | Y | Z |
|---|---|---|---|---|---|---|---|---|
| Copolymer T | | 50 | | 50 | | | | |
| Copolymer P | 70 | | 70 | | | | | |
| Copolymer Y | | | 20 | 30 | | | | |
| Exxelor VA 1803 | | | | 50 | | | | |
| Escorene HD 6705 39 | 30 | 30 | | | | | | |
| Diak #1 | 0.14 | 0.1 | | | | | | |
| Protox 169 | 0.14 | 0.1 | | | | | | |
| Irganox B-215 | 0.1 | 0.1 | 0.1 | 0.1 | 0.1 | 0.1 | 0.1 | 0.1 |
| S* | | | | | 30 | | | |
| T** | | | | | | 30 | | |
| U* | | | | | | | 30 | |
| V*** | | | | | | | | 25 |
| Capron 8209F | | | | | 70 | 70 | 70 | 75 |
| Property | | | | | | | | |
| Notched Izod Impact-⅛", Ft-lb/in. | | | | | | | | |
| 23° C. | | | | | 20 | 20 | 9.3 | 19 |
| 0° C. | | | | | 2.4 | 2.5 | 2.5 | 15 |
| −10° C. | | | | | 2.1 | 2 | | 11 |
| −20° C. | | | | | | | | 3.7 |
| −30° C. | | | | | 1.6 | 1.7 | 1.4 | 2.5 |
| −40° C. | | | | | | | | 1.8 |
| Flexural Properties | | | | | | | | |
| Modulus, Kpsi | | | | | 239 | 234 | | |

NOTE
*Dusted with 0.35% Zinc Oxide (Protox 169)
**Dusted with 0.25% Zinc Oxide (Protox 169)
***Dusted with 0.5% Zinc Oxide (Protox 169)

TABLE IV
Brominated Isobutylene-para methylstyrene Copolymer and Isobutylene-para methylstyrene Copolymer Used

| Polymer | Wt. % (1) Bromine | Mole % PMS (2) | Mole % (3) Brominated PMS | Mv (c) (4) |
|---|---|---|---|---|
| Copolymer T | 0.7 | 1.9 | 0.4 | 460,000 |
| Copolymer P | 0.5 | 2.0 | 0.3 | 460,000 |
| Copolymer C | 1.65 | 2.2 | 1.0 | 400,000 |
| Copolymer Y | none | 2.3 | none | 300,000 |

Notes
(1) Total bromine on polymer by x-ray fluorescence.
(2) Mole percent of para-methylstyrene (PMS) units
(3) Mole % brominated para-methylstyrene (PMS) units by Nuclear Magnetic Resonance (NMR).
(4) Viscosity average molecular weight by dilute solution (DSV) in diisobutylene at 68° F.

TABLE V
Abbreviations and Trademarks

| Ingredient | Description |
|---|---|
| Celanese Nylon 1001 Hoechst-Celanese | Polyamide 6,6 (PA-6,6) |
| Zytel 101 E.I. DuPont | Polyamide 6,6 (PA-6,6) |
| Capron 8209F Allied Signal | Polyamide 6 (PA-6) |
| Irganox B-215 Ciba Geigy | 33/67 Blend of Irganox 1010 and Irgafos 168 |
| Irganox 1010 Ciba Geigy | Tetrakis (methylene (3,5-di-tert-butyl-4-hydroxyhydrocinnamate) methane |
| Irgafos 168 Ciba Geigy | Tris (2,4-di-tert-butyl-phenyl) phosphate |
| Protox 169 New Jersey Zinc Co. | Zinc Oxide |
| Maglite D C.P. Hall | Magnesium oxide |
| Ken-React Caps L38/E Kenrich Petrochemical, Inc. | Neoalkyoxy, tri-(dioctyl) pyrophosphato titanate IV carried in an ethylene vinyl acetate copolymer/silica binder |
| Escorene HD 6705.39 | High density polyethylene |

TABLE V-continued

| Abbreviations and Trademarks | |
|---|---|
| Ingredient | Description |
| Exxon Chemical Company EXXELOR VA 1803 Exxon Chemical Company | Maleated ethylene-propylene rubber |
| DIAK #1 E.I. Dupont | Hexamethylene diamine carbamate |

TABLE VI

| Test Method | |
|---|---|
| Test | Test Method |
| Tensile Strength, psi | ASTM D-638 |
| Elongation, % | ASTM D-638 |
| Flexural Modulus, psi | ASTM D-790 |
| Notched Izod Impact, ft-lb/inch | ASTM D-256 |

What is claimed is:

1. A process for preparing a non-vulcanized thermoplastic composition comprising a polymer blend, which comprises the step of:

contacting, in a contacting zone, a thermoplastic polyamide, and an unvulcanized elastomeric halogen-containing random copolymer of a $C_4$ to $C_7$ isomonoolefin and a para-alkylstyrene, said para-alkylstyrene comprising 0.5 to 20 weight percent of said copolymer, with a metal compound capable of sorbing or reacting with hydrogen halide, the metal constituent of said metal compound being selected from the group consisting of Group IB, Group IIA, Group IIB, Group IVA, Group IVB, the non-noble metals of Group VIII of the Periodic Table of Elements, and mixtures thereof, said metal compound being present in said contacting zone in an amount insufficient to vulcanize said thermoplastic composition.

2. The process of claim 1, wherein said metal constituent is selected from the group consisting of copper, beryllium, magnesium, calcium, strontium, barium, zinc, cadmium, titanium, zirconium, germanium, tin, lead, iron, cobalt, nickel, ruthenium, and mixtures thereof.

3. The process of claim 1, wherein said metal constituent is selected from the group consisting of copper, magnesium, calcium, zinc, cadmium, tin, lead, titanium, cobalt, iron, nickel and mixtures thereof.

4. The process of claim 1, wherein said metal constituent is selected from the group consisting of zinc, magnesium, titanium and mixtures thereof.

5. The process of claim 1, wherein the non-metal constituent of said metal compound is selected from the group consisting of oxides, phosphates, carbonates, alkoxides, carboxylate, and mixtures thereof.

6. The process of claim 1, wherein said metal compound is selected from the group consisting of zinc oxide, magnesium oxide, a neoalkoxy, tri (dioctyl) pyrophosphato titanate, and mixtures thereof.

7. The process of claim wherein the molar ratio of said metal compound to the halogen content of said elastomeric halogen-containing copolymer is not more than about 10:1.

8. The process of claim 1, wherein the molar ratio of said metal compound to the halogen content of said halogen-containing copolymer ranges from about 0.1:1 to about 10:1.

9. The process of claim 1, wherein said contacting step is conducted at a temperature from about the melting point of said polyamide to about 300° C.

10. The process of claim 1, wherein said polyamide and said halogen-containing copolymer are in a molten phase during said contacting step.

11. The process of claim 1, wherein said polyamide, said halogen-containing copolymer and said metal compound are subjected to shearing conditions during said contacting step.

12. The process of claim 1, wherein said contacting zone is comprised in an extruder.

13. The process of claim 1, wherein said elastomeric halogen-containing copolymer comprises from above zero to about 7.5 weight percent of said halogen.

14. The process of claim 1, wherein said halogen is selected from the group consisting of chlorine, bromine, and mixtures thereof.

15. The process of claim 1, wherein said polyamide is present in an amount ranging from about 10 to 98 weight percent, and said elastomeric halogen-containing copolymer is present in an amount ranging from about 2 to about 90 weight percent, based on said polymer blend.

16. The process of claim 1, wherein a component selected from the group consisting of a filler, a rubber compounding additive and mixtures thereof is added before, during or after said contacting step.

17. The process of claim 1, wherein a component selected from the group consisting of rubber processing oils, plasticizers, and mixtures thereof is added before, during or after said contacting step.

18. The process of claim 1, wherein said non-vulcanized thermoplastic composition has a secant flexural modulus ranging from about 200 to about 100,000 kg/cm$^2$, measured according to ASTM D790 at 1% strain.

19. The process of claim 18, wherein said secant f modulus ranges from about 30,000 to 100,000 kg/cm$^2$.

* * * * *